(12) United States Patent
Kogo

(10) Patent No.: US 9,412,488 B2
(45) Date of Patent: *Aug. 9, 2016

(54) ELECTRIC CABLE

(75) Inventor: Kousuke Kogo, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 84 days.

This patent is subject to a terminal disclaimer.

(21) Appl. No.: 14/006,005

(22) PCT Filed: Feb. 24, 2012

(86) PCT No.: PCT/JP2012/001305
§ 371 (c)(1),
(2), (4) Date: Sep. 18, 2013

(87) PCT Pub. No.: WO2012/127786
PCT Pub. Date: Sep. 27, 2012

(65) Prior Publication Data
US 2014/0008099 A1  Jan. 9, 2014

(30) Foreign Application Priority Data

Mar. 22, 2011  (JP) .................................. 2011-062392

(51) Int. Cl.
| | | |
|---|---|---|
| H01B 7/00 | (2006.01) | |
| H01B 3/30 | (2006.01) | |
| C08L 23/12 | (2006.01) | |
| H01B 3/44 | (2006.01) | |
| H01B 7/295 | (2006.01) | |
| C08L 23/04 | (2006.01) | |
| C08L 23/10 | (2006.01) | |
| C08L 51/04 | (2006.01) | |
| C08L 51/06 | (2006.01) | |
| C08K 3/22 | (2006.01) | |
| H01B 3/28 | (2006.01) | |

(52) U.S. Cl.
CPC . *H01B 3/30* (2013.01); *C08L 23/12* (2013.01); *H01B 3/441* (2013.01); *H01B 7/295* (2013.01); *C08K 3/22* (2013.01); *C08L 23/04* (2013.01); *C08L 23/10* (2013.01); *C08L 51/04* (2013.01); *C08L 51/06* (2013.01); *C08L 2201/02* (2013.01); *C08L 2205/02* (2013.01); *C08L 2205/035* (2013.01); *H01B 3/28* (2013.01)

(58) Field of Classification Search
CPC ...................................................... H01B 7/295
USPC .......................................... 174/110 R, 121 A
See application file for complete search history.

(56) References Cited

U.S. PATENT DOCUMENTS

| | | | | |
|---|---|---|---|---|
| 5,470,657 A | * | 11/1995 | Hayami ........................ | 428/373 |
| 5,561,185 A | * | 10/1996 | Hashimoto et al. ........... | 524/436 |
| 6,852,921 B1 | * | 2/2005 | Koike et al. .................... | 174/36 |
| 6,866,932 B2 | * | 3/2005 | Sato et al. ..................... | 428/375 |
| 2002/0142175 A1 | | 10/2002 | Hase et al. | |
| 2009/0137174 A1 | | 5/2009 | Barber et al. | |
| 2010/0286320 A1 | * | 11/2010 | Ishiguro et al. ............... | 524/401 |

FOREIGN PATENT DOCUMENTS

| | | |
|---|---|---|
| CN | 1969007 A | 5/2007 |
| EP | 1 221 464 | 7/2002 |
| EP | 2544195 A1 | 1/2013 |
| JP | 02-018432 | 1/1990 |
| JP | 02-073838 | 3/1990 |
| JP | 11-021392 | 1/1999 |
| JP | 2002-138173 | 5/2002 |
| JP | 2007-186622 | 7/2007 |
| JP | 2007-204653 | 8/2007 |
| JP | 2007246726 A | 9/2007 |
| JP | 2009-040947 | 2/2009 |
| JP | 2009-051918 | 3/2009 |
| WO | WO 2007/134080 A2 | 11/2007 |
| WO | 2011108590 A1 | 9/2011 |

OTHER PUBLICATIONS

Communication dated Feb. 18, 2015 from the European Patent Office in counterpart European Application No. 12714394.9.
Written Opinion of the International Searching Authority mailed Jun. 18, 2012 from the European Patent Office for PCT/JP2012/001305.
International Search Report mailed Jun. 18, 2012 from the European Patent Office for PCT/JP2012/001305.
Communication dated Apr. 1, 2015 from the State Intellectual Property Office of People's Republic of China in counterpart Application No. 201280014464.7.
Communication dated Sep. 17, 2015 from the State Intellectual Property Office of the People's Republic of China in counterpart application No. 201280014464.7.
Communication dated Feb. 29, 2016, from the State Intellectual Property Office of People's Republic of China in counterpart Application No. 201280014464.7.

* cited by examiner

*Primary Examiner* — Chau N Nguyen
(74) *Attorney, Agent, or Firm* — Sughrue Mion, PLLC

(57) ABSTRACT

To provide an electric cable that can satisfy flame retardancy and battery fluid resistance in the CHFUS region provided in ISO 6722 and also satisfy wear resistance and low-temperature impact property by using a halogen-containing flame retardant. An electric cable in which a coat layer is formed of a resin composition that includes (A) 55 to 85 parts by mass of a polypropylene homopolymer, (B) 5 to 20 parts by mass of a polypropylene-based modified resin, (C) 5 to 20 parts by mass of a polyolefin-based copolymer, and (D) 5 to 15 parts by mass of a modified olefin-based elastomer, respectively and further includes 1 to 45 parts by mass of a metal hydroxide and 10 to 80 parts by mass of a halogen-containing flame retardant based on 100 parts by mass of the resins (A), (B), (C), and (D) in total.

7 Claims, No Drawings

ELECTRIC CABLE

TECHNICAL FIELD

The present invention relates to an electric cable and particularly to an electric cable that can satisfy flame retardancy, battery fluid resistance, wear resistance, and low-temperature impact property in the CHFUS region of automotive electric wires provided in ISO 6722.

BACKGROUND ART

As an insulating resin composition for covering an electric wire for automobiles, there is known, for example, a resin composition for an electric wire insulator wherein from 60 parts by mass to 90 parts by mass of a metal hydroxide has been blended to 100 parts by mass of a base resin composed of from 55 parts by mass to 98 parts by mass of a polyolefin-based polymer and the remainder of a polyamide and the polyamide is a copolymer of polyamide 6 with polyamide 66 (see, for example, Patent Literature 1). However, this resin composition has proved to have a problem that the added amount of magnesium hydroxide is so large that the resin composition cannot satisfy the battery fluid resistance according to ISO 6722 (2006 version).

Then, in order to satisfy the battery fluid resistance, studies for satisfying flame retardancy and battery fluid resistance without using magnesium hydroxide as much as possible were carried out, so that addition of a halogen-containing flame retardant was discovered (see, for example, Patent Literature 2). As a result, a blend system by which both battery fluid resistance and flame retardancy are satisfied simultaneously was discovered, but this caused an adverse influence, that is, a problem that low-temperature resistance and wearness deteriorate.

Besides, resin compositions provided with flame retardancy have been known (see, for example, Patent Literatures 3 to 6), but none of them can satisfy flame retardancy, battery fluid resistance, low-temperature impact property, and wear resistance simultaneously.

CITATION LIST

Patent Literature

PTL 1
Japanese Patent Application Laid-Open (JP-A) No. 2009-40947
PTL 2
JP-A No. 2-73838
PTL 3
JP-A No. 11-21392
PTL 4
JP-A No. 2007-204653
PTL 5
JP-A No. 2009-51918
PTL 6
JP-A No. 2-18432

SUMMARY OF INVENTION

Technical Problem

An object of the present invention is to provide an electric cable that can satisfy flame retardancy and battery fluid resistance in the CHFUS region provided in ISO 6722 and also satisfy wear resistance and low-temperature impact property by using a halogen-containing flame retardant.

Solution to Problem

As a result of various studies for attaining the above object, it was found that bromine-containing flame retardants deteriorate wearness and low-temperature impact property. However, if the quantity of a bromine-containing flame retardant is reduced, flame retardancy may deteriorate. Then, as a result of various studies for improving wearness, the property was able to be satisfied by controlling the blending amount of a polypropylene homopolymer. However, a problem that low-temperature impact performance further deteriorates was caused due to the fact that it was inferior in low-temperature impact performance, which is a characteristic property of polypropylene resins. Then, a study for improving low-temperature impact performance while maintaining the blending amount of a polypropylene homopolymer (without deteriorating wear performance) was made, whereby the above-described problem has been solved by the use of a modified olefin-based elastomer.

The present invention that solves the aforementioned problems includes the following.

(1) An electric cable in which a coat layer is formed of a resin composition that includes (A) 55 to 85 parts by mass of a polypropylene homopolymer, (B) 5 to 20 parts by mass of a polypropylene-based modified resin, (C) 5 to 20 parts by mass of a polyolefin-based copolymer, and (D) 5 to 15 parts by mass of a modified olefin-based elastomer, respectively and further includes 1 to 45 parts by mass of a metal hydroxide and 10 to 80 parts by mass of a halogen-containing flame retardant based on 100 parts by mass of the resins (A), (B), (C), and (D) in total.

(2) The electric cable according to the above (1), wherein the polypropylene-based modified resin (B) is one prepared by graft-copolymerizing maleic anhydride to a polypropylene-based resin.

(3) The electric cable according to the above (2), wherein the maleic anhydride has an acid value (JIS K0070) of 15 to 55.

(4) The electric cable according to the above (1), wherein the polypropylene-based modified resin (B) has a weight average molecular weight of 15,000 to 50,000.

(5) The electric cable according to the above (1), wherein the polypropylene-based copolymer (C) is a block copolymer or a random copolymer composed of propylene as a primary component with other alpha-olefins.

(6) The electric cable according to the above (1), wherein the metal hydroxide is magnesium hydroxide.

(7) The electric cable according to the above (6), wherein the magnesium hydroxide is magnesium hydroxide surface-treated with a fatty acid or a silane coupling agent.

(8) The electric cable according to the above (1), wherein the halogen-containing flame retardant is a bromine-containing flame retardant.

(9) The electric cable according to the above (8), wherein the bromine-containing flame retardant is tetrabromobisphenol A-bis(2,3-dibromopropyl ether).

Advantageous Effects of Invention

According to the present invention, it is possible to provide an electric cable that can satisfy flame retardancy and battery fluid resistance in the CHFUS region provided in ISO 6722 and also satisfy wear resistance and low-temperature impact property by using a halogen-containing flame retardant.

DESCRIPTION OF EMBODIMENTS

The electric cable of the present invention is characterized in that a coat layer is formed of a resin composition that includes (A) 55 to 85 parts by mass of a polypropylene homopolymer, (B) 5 to 20 parts by mass of a polypropylene-based modified resin, (C) 5 to 20 parts by mass of a polyolefin-based copolymer, and (D) 5 to 15 parts by mass of a modified olefin-based elastomer, respectively and further includes 1 to 45 parts by mass of a metal hydroxide and 10 to 80 parts by mass of a halogen-containing flame retardant based on 100 parts by mass of the resins (A), (B), (C), and (D) in total.

First, the respective components of the non-crosslinked resin composition of the present invention are described below.

<Resin Composition>

((A) Polypropylene Homopolymer)

The blending amount of the polypropylene homopolymer to be used for the present invention is 55 to 85 parts by mass, preferably 60 to 30 parts by mass, and more preferably 60 to 70 parts by mass based on 100 parts by mass of the resin. If the blending amount is less than 55 parts by mass, wearness may be insufficient, and if it exceeds 85 parts by mass, low-temperature impact property may deteriorate.

((B) Polypropylene-Based Modified Resin)

The polypropylene-based modified resin to be used for the present invention is one prepared by graft-copolymerizing maleic anhydride to a polypropylene-based resin. The polypropylene-based modified resin may be one produced by either of the melting process and the solution process. The acid value (JIS K0070) of the maleic anhydride is preferably 15 to 55 and more preferably 30 to 40. The weight average molecular weight of the polypropylene-based modified resin is preferably 15,000 to 50,000 and more preferably 20,000 to 40,000.

The blending amount of the polypropylene-based modified resin is 5 to 20 parts by mass and preferably 10 to 5 parts by mass based on 100 parts by mass of the resin. If the blending amount of the polypropylene-based modified resin is less than 5 parts by mass, wearness may deteriorate. If the content is larger than 20 parts by mass, no particularly remarkable effects may not be obtained.

((C) Polyolefin-Based Copolymer)

The polyolefin-based copolymer to be used for the present invention is preferably composed of a single species or two or more species selected from known propylene (co)polymers such as block copolymers or random copolymers of propylene as a primary component with other alpha-olefins, e.g., propylene-ethylene random copolymers, propylene-alpha-olefin random copolymers, and propylene-ethylene-alpha-olefin random copolymers.

The blending amount of the polyolefin-based copolymer is 5 to 20 parts by mass, preferably 10 to 15 parts by mass based on 100 parts by mass of the resin. If the blending amount is less than 5 parts by mass, low-temperature property may be insufficient, and if it exceeds 20 parts by mass, wearness may deteriorate.

((D) Modified Olefin-Based Elastomer)

The modified olefin-based elastomer to be used in the present invention is one having the structure described below and having been modified. As to the structure, examples of an amorphous rubber include ethylene/propylene copolymer rubber (EPM), ethylene/1-butene copolymer rubber (EPM), ethylene/propylene/butene copolymer rubber, and ethylene/propylene/nonconjugated diene copolymer rubber (EPDM). In addition, examples of a styrenic thermoplastic elastomer include block copolymers having an aromatic vinyl-based polymer block (hard segment) and a conjugated diene-based polymer block (soft segment) or random copolymers. Examples of an aromatic vinyl compound include styrene, alpha-alkyl-substituted styrenes, such as alpha-methylstyrene, alpha-ethylstyrene and alpha-methyl-p-methylstyrene, nucleus alkyl-substituted styrenes, such as o-methylstyrene, m-methylstyrene, p-methylstyrene, 2,4-dimethylstyrene, ethylstyrene, 2,4,6-trimethylstyrene, o-tert-butylstyrene p-tert-butylstyrene and p-cyclohexylstyrene. Examples of a conjugated diene compound include butadiene, isoprene, and methylpentadiene.

As other rubber components, diene rubbers, such as styrene-butadiene rubber (SBR) nitrile rubber (NBR), and butyl rubber (IIR), may be used.

As to modification, one produced by either of the melting process and the solution process can be used. The acid value (JIS K0070) of the maleic anhydride is 15 to 55 and preferably 30 to 40.

The blending amount of the modified olefin-based elastomer is 5 to 15 parts by mass, preferably 5 to 10 parts by mass based on 100 parts by mass of the resin. If the blending amount is less than 5 parts by mass, low-temperature property may be insufficient, and if it exceeds 15 parts by mass, wearness may deteriorate.

(Metal Hydroxide)

Examples of the metal hydroxide as a flame retardant include compounds having a hydroxyl group or water of crystallization, such as magnesium hydroxide, aluminum hydroxide, calcium hydroxide, basic magnesium carbonate, hydrated aluminum silicate, and hydrated magnesium silicate, and combinations thereof. Among these, magnesium hydroxide and aluminum hydroxide are preferred and particularly magnesium hydroxide, especially magnesium hydroxide surface-treated with a fatty acid or a silane coupling agent is preferably used. The blending amount of the metal hydroxide is 1 to 45 parts by mass, preferably 20 to 30 parts by mass based on 100 parts by mass of the resins (A), (B), (C), and (D) in total. If the blending amount is less than one part by mass, flame retardancy may be insufficient, and if it exceeds 45 parts by mass, battery fluid resistance tends to deteriorate.

(Halogen-Containing Flame Retardant)

The halogen-containing flame retardant includes bromine-containing flame retardants and chlorine-containing flame retardants and examples thereof include hexabromobenzene, ethylene bis-dibromonorbornanedicarboxyimide, ethylene bis-tetrabromophthalimide, tetrabromo-bisphenol S, tris(2,3-dibromopropyl-1) isocyanurate, hexabromocyclododecane (HBCD), octabromophenyl ether, tetrabromobisphenol A (TBA) epoxy oligomer or polymer, TBA-bis(2,3-dibromopropyl ether), chlorinated polyolefins, perchlorocyclopentadecane, decabromodiphenyloxide, polydibromophenyleneoxide, bis(tribromophenoxy)ethane, ethylene bis-pentabromobenzene, dibromoethyl-dibromocyclohexane, dibromoneopentyl glycol, tribromophenol, tribromophenol allyl ether, tetradecabromo-diphenoxybenzene, 2,2-bis(4-hydroxy-3,5-dibromophenyl)propane, 2,2-bis(4-hydroxyethoxy-3,5-dibromophenyl)propane, pentabromophenol, pentabromotoluene, pentabromodiphenyl oxide, hexabromodiphenyl ether, octabromodiphenyl ether, octabromodiphenyl oxide, dibromoneopentyl glycol tetracarbonate, bis(tribromophenyl)fumaramide, N-methylhexabromophenylamine, and combinations thereof. Among these, bromine-containing flame retardants are preferred and TBA-bis(2,3-dibromopropyl ether) is most preferred. Use of a bromine-containing flame retardant, antimony dioxide and antimony trioxide in combination can satisfy flame retardancy in a smaller blending amount. The blending amounts of the halogen-containing flame retardant is 10 to 80 parts by mass, preferably 20 to 50 parts by mass based on 100 parts by mass of the resins (A), (B), (C), and (D) in total. If the blending amount is less than 10 parts by mass, flame retardancy may be insufficient and if it exceeds 80 parts by mass, flame retardancy may not be improved and other physical properties, e.g., wear resistance, may deteriorate or the flame retardant may bleed out.

In the present invention, flame retardants, flame retardant adjuvants, antioxidants, metal deactivators, antiaging agents, lubricants, fillers and reinforcing materials, UV absorbents, stabilizers, plasticizers, pigments, dyestuffs, coloring agents, antistatic agents, foaming agents, and the like may be incorporated in addition to the above-described essential components as far as the effect of the present invention is not impaired.

<Electric Cable>

The electric cable of the present invention is made by coating a conductor with a cover layer formed of the above-described resin composition. That is, it is obtained by melt-mixing the above-described resin composition desirably with various additives by a conventional method and then coating a conductor with the resulting composition by a conventional method using an extruder or the like. As means for mixing the composition, an apparatus capable of compounding, such as an extruder, a Henschel mixer, a kneader, a screw type kneading machine, a Banbury mixer, and a roll mill, can be used.

Since the electric cable of the present invention has been made by coating a conductor with a cover layer formed of the above-described resin composition, the properties of the above-described resin composition of the present invention are exerted directly and, therefore, an electric cable that excels in low-temperature impact property and that satisfies flame retardancy, battery fluid resistance, and wear resistance can be obtained.

The electric cable of the present invention is used suitably for electric wires for automobiles, household electric wires, and the like.

EXAMPLES

The present invention is described in more detail below with reference to Examples, but the invention is not limited to the Examples.

(Production of Electric Cable)

The resin compositions used in Examples were prepared by kneading the respective components of the blending amounts (parts by mass) given in Tables 1 to 3 by a kneader or a screw type kneading machine, and then electric cables were produced by using these resin compositions, charging them into an extruder (Diameter 60 mm, L/D=24.5, FF screw), and extruding them onto a conductor at an extrusion rate of 500 m/min and an extrusion temperature of 230 degree C. The details of the respective components in Tables 1 to 3 are as follows.

Polypropylene homopolymer: Q100f produced by SunAllomer Ltd.

Polypropylene-based modified resin YOUMEX 1001 produced by Sanyo Chemical Industries, Ltd.

Polyolefin-based copolymer: E185GK produced by Prime Polymer Co., Ltd.

Olefin-based elastomer: TAFMER MH7020 produced by Mitsui Chemicals, Inc.

Metal hydroxide: KISUMA 5A, produced by Kyowa Chemical Industry Co., Ltd.

Halogen-containing flame retardant: FLAMECUT 121K, produced by TOSOH Corporation

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Components | A Polypropylene homopolymer | 55 | 55 | 55 | 85 | 85 | 85 | 70 | 70 | 70 |
|  | B Polypropylene-based modified resin | 20 | 20 | 20 | 5 | 5 | 5 | 10 | 10 | 10 |
|  | C Polyolefin-based copolymer | 20 | 20 | 20 | 5 | 5 | 5 | 10 | 10 | 10 |
|  | D Modified olefin-based elastomer | 15 | 15 | 15 | 5 | 5 | 5 | 10 | 10 | 10 |
|  | Halogen-containing flame retardant | 10 | 50 | 80 | 10 | 50 | 80 | 10 | 50 | 80 |
|  | Metal hydroxide | 1 | 30 | 45 | 1 | 30 | 45 | 1 | 30 | 45 |
| Properties | Battery fluid resistance | ○ | ○ | ○ | ○ | ○ | ○ | ○ | ○ | ○ |
|  | Flame retardancy | ○ | ○ | ○ | ○ | ○ | ○ | ○ | ○ | ○ |
|  | Wear resistance | ○ | ○ | ○ | ○ | ○ | ○ | ○ | ○ | ○ |
|  | Low-temperature impact property | ○ | ○ | ○ | ○ | ○ | ○ | ○ | ○ | ○ |

TABLE 2

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Components | A Polypropylene homopolymer | 70 | 70 | 70 | 70 | 70 | 70 | 70 | 70 |

TABLE 2-continued

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
|  | B Polypropylene-based modified resin | 10 | 10 | 10 | 10 | 10 | 10 | 10 | 10 |
|  | C Polyolefin-based copolymer | 10 | 10 | 10 | 10 | 10 | 10 | 10 | 10 |
|  | D Modified olefin-based elastomer | 10 | 10 | 10 | 10 | 10 | 10 | 10 | 10 |
|  | Halogen-containing flame retardant | 9 | 81 | 9 | 81 | 10 | 80 | 10 | 80 |
|  | Metal hydroxide | 1 | 1 | 45 | 45 | 0 | 46 | 0 | 46 |
| Properties | Battery fluid resistance | ○ | ○ | ○ | ○ | ○ | x | ○ | x |
|  | Flame retardancy | x | ○ | x | ○ | x | ○ | x | ○ |
|  | Wear resistance | ○ | x | ○ | x | ○ | ○ | ○ | ○ |
|  | Low-temperature impact property | ○ | x | ○ | x | ○ | ○ | ○ | ○ |

TABLE 3

|  |  | Comparative Example 9 | Comparative Example 10 | Comparative Example 11 | Comparative Example 12 | Comparative Example 13 | Comparative Example 14 |
|---|---|---|---|---|---|---|---|
| Component | A Polypropylene homopolymer | 76 | 59 | 76 | 59 | 76 | 64 |
|  | B Polypropylene-based modified resin | 4 | 21 | 10 | 10 | 10 | 10 |
|  | C Polyolefin-based copolymer | 10 | 10 | 21 | 10 | 10 | 10 |
|  | D Modified olefin-based elastomer | 10 | 10 | 10 | 10 | 4 | 16 |
|  | Halogen-containing flame retardant | 50 | 50 | 50 | 50 | 50 | 50 |
|  | Metal hydroxide | 30 | 30 | 30 | 30 | 30 | 30 |
| Properties | Battery fluid resistance | ○ | ○ | ○ | ○ | ○ | ○ |
|  | Flame retardancy | ○ | x | ○ | ○ | ○ | ○ |
|  | Wear resistance | x | ○ | ○ | x | ○ | x |
|  | low-temperature impact property | ○ | ○ | x | ○ | x | ○ |

<Evaluation of Electric Cable>

The electric cables of the respective Examples and Comparative Examples prepared as above were evaluated as follows.

(Evaluation of Wear Resistance)

Measurement was carried out by the scrape abrasion specification of ISO 6722 using a 7 Newton load, a needle having a 0.45 millimeter diameters, and an electric wire having a core wire with a cross sectional area of 0.22 square millimeters and a covering with a thickness of 0.125 millimeters, and then the number of scrapes of 100 cycles or more was considered as qualified (○), whereas the number of scrapes of less than 100 cycles was considered as disqualified (x). The results of the evaluation are shown in Tables 1 to 3.

(Evaluation of Low-Temperature Impact Property)

Evaluation was carried out by the testing method provided in JIS K7216. As to the preparation of a plastic specimen, a specimen prepared using blending amounts within the ranges stipulated in the present invention was used.

As to the testing method, a prescribed impact was added to a cantilever specimen held in a testing bath of a constant temperature and a brittle point was calculated from the number of fractures; a sample having a brittle point, of −10 degree C. or lower was considered as qualified (○), whereas a sample having a brittle point higher than that was considered as disqualified (x). The results of the evaluation are shown in Tables 1 to 3.

(Evaluation of Flame Retardancy)

In a flame retardancy test of ISO 6722 in which an electric cable is set at an angle of 45 degrees within a draft chamber and an inner cone flame of a Bunsen burner is removed from a test sample after a lapse of 15 seconds in the case of a cable of 2.5 mm$^2$ or thinner or after a lapse of 30 seconds in the case of a cable having a conductor size exceeding 2.5 mm$^2$, then a cable such that the flame of the insulator was extinguished completely within 70 seconds and 50 mm or longer of the insulator in the upper part of the test sample remained unburnt was considered as qualified (○), whereas a cable such that a flame continued to burn for 70 seconds of longer or the length of the insulator remaining unburnt in the test sample was shorter than 50 mm was considered as disqualified (x). The results of the evaluation are shown in Tables 1 to 3.

Battery Fluid Resistance Test

A test was conducted in accordance with ISO 6722. A battery fluid ($H_2SO_4$ solution) with a specific gravity of 1.260 plus or minus 0.005 was added dropwise to an insulating electric cable so that the drops might be avoided from coming into contact with each other. Subsequently, the insulating electric cable was held within an oven of 90 degree C. for 8 hours and then taken out, and thereafter battery fluid drops were added in the above-described manner and then the cable was held in the 90 degree C. oven for 16 hours. This procedure cycle was repeated two cycles in total and then the cable was left at rest at room temperature (23 degree C. plus or minus 5 degree C.) for 30 minutes. Subsequently, the electric cable was wound on a prescribed mandrel and the insulating coat part of the wound cable was observed visually. A voltage resistance test was carried out for a sample with which no exposure of a conductor was observed, and then a sample without discontinuation of conduction was considered as qualified ("○"). Conversely, a sample in which exposure of a conductor was observed or discontinuation of conduction occurred was considered as "×". The results of the evaluation are shown in Tables 1 to 3.

Tables 1 to 3 show that satisfactory results were obtained in all the evaluations of battery fluid resistance, flame retardancy, wear resistance, and low-temperature impact property in Examples 1 to 9, in which the blending amounts of all components were within the ranges of the present invention, whereas at least one of the evaluation results was poor in Comparative Examples 1 to 14, in which at least one of the blending amounts of the respective components was out of the range of the present invention.

The comparison of the Examples with the Comparative Examples described above has revealed that it is essential to adjust the blending amounts of the respective components to within the ranges of blending amounts stipulated in the present invention in order to obtain satisfactory results with respect to all evaluation results.

The invention claimed is:

1. A electric cable comprising:
   a coat layer comprising a resin composition, the resin composition comprising:
   (A) 55 to 85 parts by mass of a polypropylene homopolymer,
   (B) 5 to 20 parts by mass of a polypropylene-based modified resin,
   (C) 5 to 20 parts by mass of a polyolefin-based copolymer, and
   (D) 5 to 15 parts by mass of a modified olefin-based elastomer,
   wherein the coat layer further comprises 1 to 45 parts by mass of a metal hydroxide and 10 to 80 parts by mass of a halogen-containing flame retardant based on 100 parts by mass of the resins (A), (B), (C), and (D) in total,
   wherein the polypropylene-based modified resin (B) is one prepared by graft-copolymerizing maleic anhydride to a polypropylene-based resin,
   wherein the metal hydroxide is magnesium hydroxide,
   wherein the halogen-containing flame retardant is a bromine-containing flame retardant, and
   wherein the bromine-containing flame retardant is tetrabromobisphenol A-bis(2,3-dibromopropyl ether).

2. The electric cable according to claim 1, wherein the maleic anhydride has an acid value (JIS K0070) of 15 to 55.

3. The electric cable according to claim 1, wherein the polypropylene-based modified resin (B) has a weight average molecular weight of 15,000 to 50,000.

4. The electric cable according to claim 1, wherein the polyolefin-based copolymer (C) is a block copolymer or a random copolymer composed of propylene as a primary component with other alpha-olefins.

5. The electric cable according to claim 1, wherein the magnesium hydroxide is magnesium hydroxide surface-treated with a fatty acid or a silane coupling agent.

6. The electric cable according to claim 1, wherein the parts by mass of the metal hydroxide is 1 to 29 based on 100 parts by mass of the resins (A), (B), (C), and (D) in total.

7. The electric cable according to claim 1, wherein the parts by mass of the halogen-containing flame retardant is 51 to 80 based on 100 parts by mass of the resins (A), (B), (C), and (D) in total.

* * * * *